United States Patent [19]

Kuo

[11] Patent Number: 5,557,173

[45] Date of Patent: Sep. 17, 1996

[54] INFRARED DETECTION CIRCUIT

[75] Inventor: Ping-jung Kuo, Sanchung City, Taiwan

[73] Assignee: IR-TEC International Ltd., Taipei Hsien, Taiwan

[21] Appl. No.: 520,418

[22] Filed: Aug. 29, 1995

[51] Int. Cl.⁶ .................................................. H05B 37/02
[52] U.S. Cl. ...................... 315/158; 315/155; 315/159; 315/362; 250/338.3; 250/221
[58] Field of Search ...................................... 315/158, 159, 315/154, 153, 155, 362, 363; 250/338.1, 338.3, 214 R, 214.1, 221

[56] References Cited

U.S. PATENT DOCUMENTS 3,176,189  3/1965  Tabet ........................................ 315/158
4,658,129  4/1987  Fan ........................................ 315/158 X
4,823,051  4/1989  Young ........................................ 315/155

*Primary Examiner*—Robert Pascal
*Assistant Examiner*—Haissa Philogene
*Attorney, Agent, or Firm*—Bacon & Thomas

[57] ABSTRACT

An electronic circuit for controlling a lamp includes a pyroelectric sensing circuit for detecting the approach of a human, a triggering circuit for receiving a signal from the pyroelectric circuit, a driving circuit for receiving a triggering signal from the triggering circuit and activating a load, and a direct current power circuit with a high-impedance circuit for providing a steady voltage to the electric circuits.

3 Claims, 2 Drawing Sheets

INFRARED DETECTION CIRCUIT

BACKGROUND OF THE INVENTION

The present invention relates to a circuit arrangement for controlling a lamp, and particularly to a circuit for controlling a fluorescent lamp in a non-contacting manner.

A conventional infrared switch for controlling an electric lamp is a so-called two-line hot wire control switch, which can only be allied to resistive loads, such as tungsten lamps, halogen lamps, etc. However, this type of switch fails to control inductive loads, such as fluorescent lamps, as the impedance of the fluorescent lamp is infinite i.e., open-circuited when the fluorescent lamp is not powered.

Under this situation, existing two-line infrared switches additionally equipped with a ground wire during installation solve the above limitation of the infrared switches by providing an infrared sensor of the switch with a sufficient electric power. However, such an approach has to additionally provide a passage on walls or within the walls, thus, it will damage the interior decoration of the house. Thus, such an approach cannot be widely used.

SUMMARY OF THE INVENTION

An object of the present invention is to provide a circuit arrangement which does not require an additional ground wire thus the interior decoration will not be damaged.

Another object of the present invention is to provide a circuit arrangement which is suitable for inductive loads.

According to the present invention, an electric circuit for controlling a lamp includes a pyroelectric sensing circuit for detecting the approach of a human, a triggering circuit for receiving a signal from the pyroelectric circuit, a driving circuit for receiving a triggering signal from the triggering circuit and activating a load, and a direct current power circuit with a high-impedance circuit for providing a steady voltage to the electric circuits.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
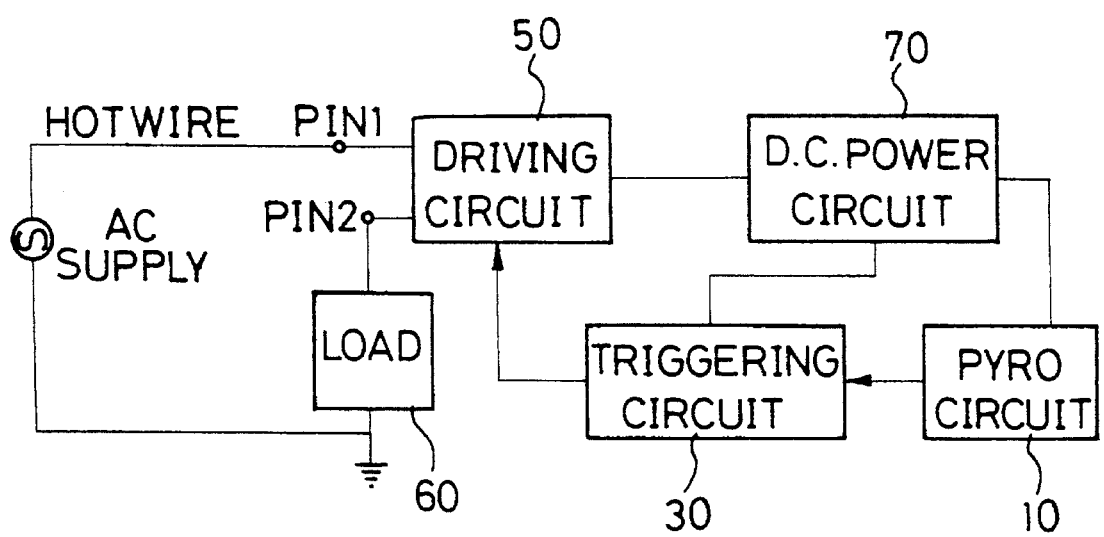
FIG. 1 is a block diagram of the circuit arrangement of the present invention.

Referring to FIG. 1, a two-line infrared sensing circuit includes a pyroelectric sensing circuit 10 receiving an infrared signal detected from a human, a triggering circuit 30 for receiving a signal from the pyroelectric sensing circuit 10, a driving circuit 50 connected with the triggering circuit 30 and having a first terminal PIN1 connected to a hot wire of an alternating current (A.C.) supply and a second terminal PIN2 connected to a first end of a load 60 having a second end grounded, and a direct current (D.C.) power circuit 70 connected between the triggering circuit 30 and the pyroelectric sensing circuit 10 for providing a steady voltage to the pyroelectric sensing circuit 10.

Figure 2:
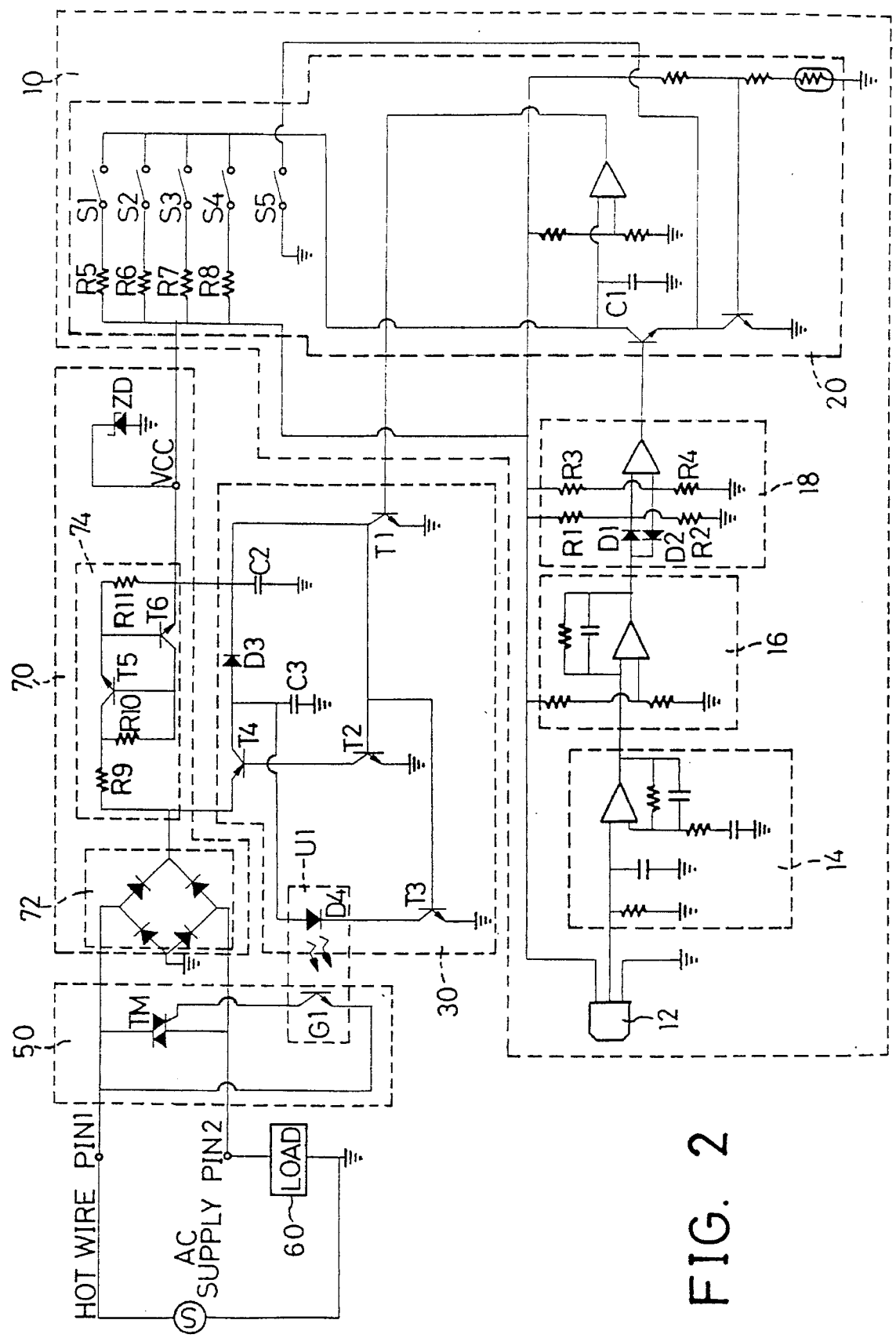
FIG. 2 is a circuit diagram of the present invention.

As shown in FIG. 2, a pyroelectric sensing circuit 10 includes a pyroelectric sensor 12 for receiving an infrared signal from a human, a first and a second amplifying stages 14, 16 for amplifying a signal from the pyroelectric sensor 12 to a suitable voltage range, a comparator 18 in cooperation with a plurality of resistors R1, R2, R3, R4 and diodes D1, D2 for comparing the amplified signal from the second amplifying stage 16 with a voltage determined by the resistors R3 and R4, and a time delay circuit 20 in cooperation with a capacitor C1, four resistors R5, R6, R7, and R8, and five switches S1, S2, S3, S4, and S5 for outputting a signal controlling the operation duration of the load 60.

The triggering circuit 30 includes a plurality of transistors T1, T2, T3, and T4, a diode D3, capacitors C2, C3 and a light emitting diode (LED) D4 of a photo coupler U1 for receiving the signal output from the pyroelectric sensing circuit 10 and outputting an optical triggering signal to the driving circuit 50. Emitters of the transistors T1, T2, and T3 are grounded. The transistor T1 receives a signal from the time delay circuit 20 and has a collector connected with respective bases of the transistors T2, T3. The transistor T4 has a base connected with a collector of the transistor T2 and a collector connected with the capacitor C3. The diode D3 is connected between collectors of the transistors T4 and T1. The capacitor C2 is connected between the collector of the transistor T1 and a ground and the LED D4 is connected between the collectors of the transistors T3 and T4.

The driving circuit 50 is composed of a triac TM having a gate thereof connected with a phototransistor G1 of the photo coupler U1 which receives the optical triggering signal from the triggering circuit 30 to activate the load 60.

The direct current power circuit 70 is composed of a full-wave rectifier 72 for rectifying a voltage between a hot wire of an AC supply shown as terminal PIN1 and the first end of the load 60, i.e., terminal PIN2, a high-impedance circuit 74 for reducing a high voltage output from the rectifier 72 into a preferred range, and a Zener diode ZD for regulating a voltage at an output of the high-impedance circuit 74 into a steady voltage. The rectifier 72 has an output connected with an emitter of the transistor T4 of the triggering circuit 30.

The high-impedance circuit 74 includes a transistor T5 having a resistor R10 connected between a base and a collector of the transistor T5, a resistor R9 connected between the output of the rectifier 72 and the collector of the transistor T5, a transistor T6 having a base connected with an emitter of the transistor T5, a collector connected with the base of the transistor T5, and an emitter connected with the Zener diode ZD and the collector of transistor T1 in the triggering circuit 30, and a resistor R11 connected between the base and the emitter of the transistor T6.

When an AC supply of 110 volts is applied onto the circuit and the load 60 is a resistive load, the output voltage of the rectifier 72 will be about 100 volts. A voltage of 6.5 volts will appear at an output of the high-impedance circuit 74, i.e., the emitter of the transistor T6.

When the pyroelectric sensing circuit 10 senses an approach of a human, the transistor T1 will be turned off by a signal from the pyroelectric sensing circuit 10 so that transistors T2, T3 and T4 will be turned on thereby activating the triac TM by triggering the photo coupler U1. Thus, a voltage of 7.8 volts will be present at the output of the rectifier 72. Thus, a voltage of 6.5 volts will appear at the collector of the transistor T1 by having the output voltage of 7.8 volts of the rectifier 72 subtract the voltage drops on each of the transistor T4 and the diode D3.

When the load 60 is an inductive load, the output voltage of the rectifier 72 will be about 65 volts without any human being detected and a voltage of 6.5 volts will be present at the output of the high-impedance circuit 74. When the triac TM is activated, i.e., infrared rays emitted by human beings are detected, an A.C. voltage of 3.3 volts will present between PIN1 and PIN2. Therefore, the output voltage of the rectifier 72 will be 7.8 volts and a voltage of 7 volts will appear at the output of the high-impedance circuit 74.

From the above arrangement, a voltage (Vcc) of 6.8 volts will be present on an anode of the Zener diode ZD for providing a power to the pyroelectric sensing circuit 10.

Although the invention has been explained in relation to its preferred embodiment, it is to be understood that many other possible modifications and variations can be made without departing from the spirit and scope of the invention as hereinafter claimed.

I claim:

1. An electronic circuit for controlling a load series-connected with the electronic circuit comprising:
    a direct current power circuit having a rectifier in series with the load, a high-impedance circuit subtracting an output voltage from the rectifier to a first predetermined voltage, and a zener diode receiving the first predetermined voltage for outputting a power voltage;
    detecting means for receiving the power voltage from the direct current power circuit and detecting infrared rays emitted from a human;
    triggering means connected with the detecting means for outputting a triggering signal and having the output voltage from the rectifier bypass the high-impedance circuit when the detecting means detects an infrared ray from a human is received as to provide a second predetermined voltage to the zener diode; and
    means for activating the load when the triggering signal is received.

2. An electronic circuit according to claim 1 wherein said triggering means comprises a first transistor, a second transistor and a third transistor respectively having a base connected with a collector of the first transistor, a fourth transistor having a base connected with a collector of the second transistor and an emitter connected to an output of the rectifier, a diode connected between collectors of the fourth and the first transistors, a light emitting diode of a photo coupler connected between collectors of the third and the fourth transistors, and a first and a second capacitors respectively connected between the collectors of the first and the fourth transistors and a ground so that the fourth transistor will be turned on and the second predetermined voltage will appear at the collector of the first transistor when the detecting means detects an infrared ray from a human.

3. An electronic circuit according to claims 1 or 2 wherein said high-impedance circuit comprises a first resistor connected with an output of the rectifier, a second resistor series connected with the first resistor, a fifth transistor connected in parallel with the second resistor, a sixth transistor having a collector connected with a base of the fifth transistor, a base connected with an emitter of the fifth transistor, and an emitter connected to the zener diode and the collector of the first transistor, and a second resistor connected between the base and the emitter of the sixth transistor.

* * * * *